June 6, 1950
C. DONNELL
2,510,212
BUCKET TYPE CONVEYER MECHANISM
Filed March 7, 1949
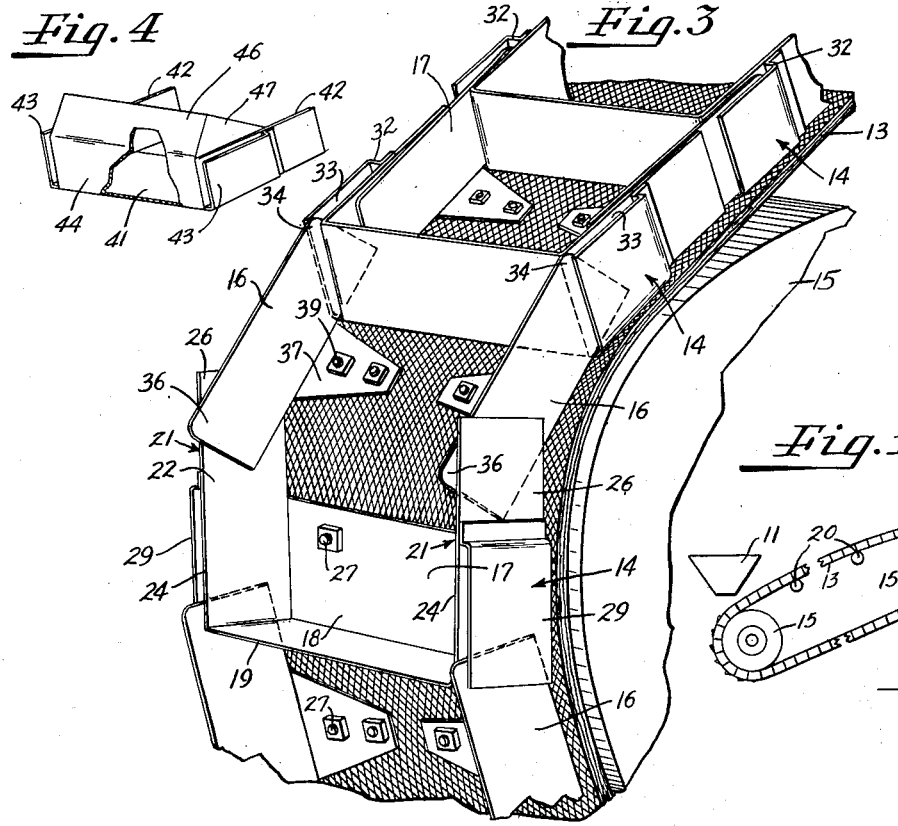
Inventor
Charlie Donnell
By
McCanna and Morsbach
Attys.

Patented June 6, 1950

2,510,212

UNITED STATES PATENT OFFICE 2,510,212

BUCKET TYPE CONVEYER MECHANISM

Charlie Donnell, Lovelock, Nev.

Application March 7, 1949, Serial No. 80,016

6 Claims. (Cl. 198—196)

This invention relates to conveyer mechanisms and more particularly to bucket type conveyer mechanisms.

It is an object of the invention to provide a conveyer mechanism of the above character that is of simple construction, that may be made from stamped parts, that is of relatively light weight, that is easy to assemble and that is relatively inexpensive to manufacture.

Another object of the invention is to provide a novel conveyer mechanism of the above character that may be utilized for conveying material horizontally or either up or down a grade equally well.

Another object of the invention is to provide a conveyer mechanism of the above character employing a flexible endless belt with a plurality of compartments for receiving loose material with a novel arrangement and construction of side walls defined by overlapping relatively movable portions mounted so that the bottom edges substantially conform to the configuration of the belt and thereby define a continuous imperforate wall that insures against the loss of material from the conveyer as it is being conveyed from one station to another station.

Other objects and advantages of the invention will become apparent from the following detailed description taken in connection with the accompanying drawings, in which:

Figure 1 is a side elevational view of an installation embodying the present invention in a greatly reduced scale in which the buckets are of the hopper loaded type;

Fig. 2 is a plan view of the conveyer;

Fig. 3 is an enlarged perspective view of the conveyer mechanism showing the details of construction; and Fig. 4 shows a modified form of the invention in which the buckets are of the self loading type.

Referring now to the drawings, the invention is shown embodied in a conveyer mechanism for carrying loose material such as sand, gravel, ore, tailings, grain and the like materials between two preselected stations, such as a hopper 11 and a storage pile 12. In general the conveyer mechanism comprises a flexible endless belt 13 mounted on spaced pulleys 15 and rollers 20 forming a part of a boom, not shown. Mounted on the belt is a plurality of buckets 14 and side plates 16 between adjacent buckets to define compartments 17 shaped to receive loose material having novel side walls that can expand and contract and conform to the periphery of the belt in the event the endless belt changes its direction of movement, i. e. curvature, so as to prevent the loss of material from the sides of the compartment as it is being conveyed between the preselected stations regardless of whether the material is being conveyed horizontally, up or down-grade.

As best seen in Figs. 2 and 3 each bucket 14 comprises a mounting portion 18 shaped to be in face to face relation with the belt 13 and a rib portion 19 defining a back of the bucket projecting outwardly from the belt 13. Extending forwardly from the back 19 along opposite edges of the belt 13 are side members 21 defining opposed faces 22. The side members 21 extend forwardly beyond the mounting portion 18 and terminate short of the back 19 of an adjacent bucket 14. The side members 21 may be considered to define sides 24 of the individual buckets and wings 26 projecting forwardly from the buckets along opposite edges of the belt. The buckets 14 may be secured to the belt 13 by any suitable means. As shown herein each bucket is secured to the belt by spaced bolts 27 extending through the mounting portion 18 and the belt 13. The bolts 27 are spaced forwardly of the back 19 of each bucket a sufficient distance. With this construction, as shown in Fig. 3, the belt may be flexed away from the bottoms of mounting portion 18 adjacent the back 19 and the wings 26. In effect this provides a pivotal mounting for the bucket.

In outwardly spaced relation with the side member 21 are auxiliary side members 29. The latter are in spaced side-by-side relation with the sides 24. The auxiliary side members 29 are rigidly connected with opposite sides of the mounting portion 18 by connecting portions 31 and are rigidly connected with the side members 21 by connecting portions 32. As shown each connecting portion 31 is integral with both the mounting portion 18 and the respective auxiliary side member 29. Each connecting portion 32 is integral with one edge of each auxiliary side member 29 and is secured to the outer side of the side member 21 as by welding or the like. The aforegoing construction in effect defines a pocket or recess 33 on opposite sides of each bucket 14 opening rearwardly of the bucket and away from the belt 13.

The side plates 16 are mounted on the edges of the belt 13 between adjacent buckets. Each plate has a portion 34 received in the recess 33 on one bucket 14 and a portion 36 disposed in side-by-side relation with one of the opposed faces 22 on the side members 21 of an adjacent bucket. Intermediate the ends of each side plate 16 the latter is formed with a mounting bracket or arm 37 extending inwardly from the edge of the belt 13 in side by side relation therewith. Any suitable means such as machine screws 39 or the like extending through the bracket 37 and the belt 13 may be used for securing each side plate 16 to the belt 13. This construction in effect provides a pivotal mounting for each side plate in a manner similar to that for each bucket.

As best seen in Fig. 2 the sides 24, the wings 26, the mounting portions 18, the belt 13, the side plates 16 and the backs 19 of adjacent buckets 14 when facing upwardly define a compartment 17 for receiving the loose material having side walls between adjacent buckets in which portions thereof are telescopically mounted and arranged to move relative to each other to conform to the configuration of the belt 13 as best seen in Fig. 3. Where the portions of the belt 13 between the pulleys bows or arches only slightly as shown in Figure 1 it is readily apparent that the bottoms of the side plates 16 and the side members 24 rest on the belt 13 and that the overlap between the parts is such that the walls are imperforate. Consequently no material can be lost from the compartments through openings in the side walls of the compartments.

This arrangement and construction of the parts provides an extremely strong side wall construction. Thus, as best seen in Figs. 2 and 3 the side members 16 are mounted so that the end portions 36 are on the inside of the compartment 17. With this construction any side thrust or pressure due to the material in the compartment pressing against the side walls urges the end portions 36 into tight engagement with the respective side member 21. The latter is rigidly supported and resists outward movement of the end 36. The end 34 in each pocket 33 under the above conditions is also urged against the auxiliary side member 29. The latter is of relatively rigid construction and prevents outward movement of the end 34.

Due to the fact that there is a reinforcing action in the side walls, the buckets 14 and the side plates 16 may be made of relatively light gauge metallic stock. As a result this construction may be made very inexpensively. The buckets may be readily made as single stampings. The side plates 16 may also be made as single stampings. Where desired the bucket and the side plate parts may be cut from light gauge material by conventional tin snips. The forming of the bucket is relatively simple since all the deformed parts are at substantially right angles to the base parts. It is apparent that very inexpensive machinery may be used to produce these conveyer parts. Any type of flexible belt may be used, such as a canvas or canvas-rubber and the like. The buckets 14 and side plates 16 may be easily assembled on the belt since only machine screws are required for this purpose.

An important advantage of this structure is that it is of an extremely light weight construction and consequently can be readily transported from place to place. Also this construction can be used to convey material in a horizontal direction or up or down grade, equally well.

A self-loading type of bucket is shown in Fig. 4. This bucket may be formed in a manner similar to that in which the bucket shown in Figs. 1-3 is formed. This bucket includes a mounting portion 41, side members 42, auxiliary side members 43 and a back 44. Mounted on the upper edge of the back 44 and extending forwardly thereof in an inclined manner is a lip portion 46. The latter is secured at its ends to the side plate 42 by connecting portions 47. This construction operates in the same manner as the construction shown in Figure 1 with the exception that the hopper is eliminated and the boom supporting the conveyer mechanism is adjusted so that the buckets are disposed in the stock pile. Thus, upon movement of the belt 13 the buckets move through the stock pile and load themselves.

I claim:

1. In a conveying mechanism for loose material, the combination of an endless flexible belt, a plurality of buckets mounted on said belt in spaced relation, each of said buckets having a back, side members defining opposed faces, and recesses on opposite sides, side plates on opposite edges of the belt between buckets each having a portion shaped to be slidably received in one of the respective recesses on one bucket and a portion disposed adjacent one of the opposed faces of the side members on an adjacent bucket and means for mounting said side plates and said buckets on said flexible belt to define pivotal mountings for said plates and buckets, said plates, said side members and the backs of adjacent buckets when facing upwardly forming compartments shaped to contain loose material having side walls in which portions thereof overlap and are free to move relative to each other to conform to the configuration of the belt to define continuous side walls when the belt changes its direction of movement whereby the compartments positively retain material therein under the above described conditions.

2. In a conveying mechanism for loose material, the combination of an endless belt, a plurality of buckets mounted on said belt in spaced relation, each of said buckets having a back extending transversely of the belt and projecting outwardly therefrom and side members adjacent the respective edges of the belt defining opposed faces extending in one direction from the back, and pockets adjacent the side members opening in the opposite direction from the back and in a direction away from the belt, side plates between buckets adjacent the edges of the belt each having an end portion shaped to be slidably received in one of the pockets on one of the buckets and an end portion disposed in side by side relation with one of the opposed faces of the sides with an adjacent bucket, the backs of adjacent buckets, the sides and side plates between adjacent buckets when facing upwardly defining compartments for receiving material on the belt having side walls, and means for mounting said side plates and said buckets on said flexible belt to effect relative movement between said side plates and said sides and buckets when said belt changes its configuration to permit relative movement of portions of said side walls of said compartments to define continuous side walls for said compartments under the above conditions to positively retain material in said compartments.

3. In a conveying mechanism, the combination of an endless flexible belt, a plurality of buckets disposed substantially equal distances apart on said belt, each bucket comprising a mounting portion in face to face relation with the belt, a back portion extending transversely of the belt and in substantially perpendicular relation to said mounting portion to project outwardly from the belt, first side portions in substantially perpendicular relation to said mounting portion along opposite edges of the belt defining opposed faces, wings projecting from each side portion along the edges of the belt extending to a position short of a back of an adjacent bucket, and second side portions in substantially parallel relation with said first side portions and defining therewith pockets on opposite sides of each bucket opening in a direction away from the direction in which the wing extends and outwardly away from the belt, means spaced from the back for attaching the mounting portion to the belt, side plates disposed between adjacent buckets on opposite sides of the belt in substantially perpendicular relation thereto, said plates each having an end portion shaped to be received in one of the pockets on one bucket and an end shaped to be adjacent the inner facing sides of the side portions of an adjacent bucket, and means intermediate the ends of the side plates for mounting the latter adjacent the edges of the belt, said belt, said side plates, said side portions, backs of adjacent buckets, and said mounting portions, when facing upwardly, defining compartments having reinforced side walls on the belt for conveying materials in which portions of the side walls telescope together and move relative to each other when the belt arches to define continuous imperforate walls whereby to prevent the loss of material from said compartments.

4. In a conveyor of the type utilizing an endless belt mounted on spaced pulleys, the combination of a plurality of buckets each comprising a mounting portion in face to face relation with the belt and having its end portions at substantially right angles thereto and projecting outwardly from the belt, a second portion integral with the mounting portion projecting outwardly from the belt to define a back of the bucket and having its end portions extending along the edges of the belt between the ends of the mounting portion and in spaced relation thereto to define sides for the bucket with opposed faces and recesses on opposite sides of the bucket, wings projecting beyond the mounting portion, side plates extending along the edges of the belt between adjacent buckets projecting outwardly from the belt each having an end portion shaped to be received in one of said recesses in one bucket and a portion in side by side relation with said sides and wings of the adjacent bucket and a bracket portion intermediate its ends for mounting the side plates on the belt, and means for mounting each mounting portion on the belt permitting flexing of the belt away from the mounting portion adjacent the back and wing portions of the bucket, said mounting portions, flexible belt, sides, wings, side plates and backs of adjacent buckets when facing upwardly defining compartments for containing material having side walls in which portions of the walls overlap and are free to move relative to each other to conform to the configuration of the belt whereby to define continuous imperforate side walls for said compartments.

5. In a conveyer of the type utilizing an endless belt mounted on spaced pulleys, the combination of a plurality of buckets disposed on said belt each comprising a first member projecting outwardly from the belt to define a back and having its ends extending along the edges of the belt in one direction from the back to define sides and a second member integral with the first member and in side by side relation with the belt having its end portions projecting outwardly from the belt in spaced side by side relation with the sides and having a portion secured to each adjacent side to impart rigidity to the bucket and define recesses on opposite sides of the bucket, means extending through the belt for mounting said second member on the belt permitting flexing of the belt away from the second member adjacent the back and extreme ends of the side portions, side plates extending along the edges of the belt between adjacent buckets projecting outwardly from the belt each having a portion shaped to be received in one of said recesses and a portion in side by side relation with one of the opposed faces of an adjacent bucket and having a bracket intermediate its ends for mounting said second member, said belt, sides, side plates and backs of adjacent buckets when facing upwardly defining compartments for containing material having side walls in which portions thereof overlap and move relative to each other when the belt changes its direction of movement to define continuous side walls conforming to the configuration of the belt to prevent loss of material from the compartments.

6. The combination recited in claim 1 in which each bucket has a portion integral with the back inclined outwardly from the belt toward but short of the back of an adjacent bucket and is attached to the side portions on opposite edges of the belt to define a self-loading bucket.

CHARLIE DONNELL.

REFERENCES CITED

The following references are of record in the file of this patent:

UNITED STATES PATENTS

| Number | Name | Date |
|---|---|---|
| 284,324 | Parker et al. | Sept. 4, 1883 |
| 551,509 | Paul | Dec. 17, 1895 |
| 679,573 | Potter | July 30, 1901 |
| 850,684 | Smulders | Apr. 16, 1907 |
| 1,112,948 | Turnbull | Oct. 6, 1914 |
| 1,728,652 | Barber | Sept. 17, 1929 |